United States Patent
Bai et al.

(10) Patent No.: US 7,056,613 B2
(45) Date of Patent: Jun. 6, 2006

(54) FUEL CELL HAVING METALIZED GAS DIFFUSION LAYER

(75) Inventors: Lijun Bai, Spokane, WA (US); Greg A. Lloyd, Spokane, WA (US)

(73) Assignee: Relion, Inc., Spokane, WA (US)

( * ) Notice: Subject to any disclaimer, the term of this patent is extended or adjusted under 35 U.S.C. 154(b) by 348 days.

(21) Appl. No.: 10/431,870

(22) Filed: May 7, 2003

(65) Prior Publication Data

US 2003/0198861 A1 Oct. 23, 2003

Related U.S. Application Data

(62) Division of application No. 10/033,599, filed on Dec. 27, 2001, now Pat. No. 6,716,549.

(51) Int. Cl.
*H01M 3/02* (2006.01)

(52) U.S. Cl. .............. 429/34; 429/12; 429/44; 429/45

(58) Field of Classification Search ............ 429/30, 429/34, 40, 12, 44, 45
See application file for complete search history.

(56) References Cited

U.S. PATENT DOCUMENTS

| | | |
|---|---|---|
| 4,847,172 A | 7/1989 | Maskalick et al. |
| 4,997,728 A | 3/1991 | Onoda et al. |
| 5,035,962 A | 7/1991 | Jensen |
| 5,037,525 A | 8/1991 | Badwal |
| 5,059,497 A | 10/1991 | Prince et al. |
| 5,143,801 A | 9/1992 | Bates |
| 5,286,568 A | 2/1994 | Bacino et al. |
| 5,346,780 A | 9/1994 | Suzuki |
| 5,618,392 A | 4/1997 | Furuya |
| 5,635,039 A | 6/1997 | Cisar et al. |
| 5,733,682 A | 3/1998 | Quadakkers et al. |
| 5,736,269 A | 4/1998 | Okamoto et al. |
| 5,786,105 A | 7/1998 | Matsushima et al. |
| 5,795,671 A | 8/1998 | Nirasawa et al. |
| 5,945,231 A | 8/1999 | Narayanan et al. |
| 5,998,057 A | 12/1999 | Koschany et al. |
| 6,010,798 A | 1/2000 | Hammerschmidt et al. |
| 6,022,634 A | 2/2000 | Ramunni et al. |
| 6,037,075 A | 3/2000 | Critz et al. |
| 6,042,955 A | 3/2000 | Okamoto |
| 6,051,343 A | 4/2000 | Suzuki et al. |
| 6,051,778 A | 4/2000 | Ichinose et al. |
| 6,054,228 A | 4/2000 | Cisar et al. |
| 6,054,230 A | 4/2000 | Kato |
| 6,066,409 A | 5/2000 | Ronne et al. |
| 6,080,290 A | 6/2000 | Stuart et al. |

(Continued)

OTHER PUBLICATIONS

B.D. Cullity, "Elements of X-Ray Diffraction," Addison-Wesley Publishing Co., Inc. (1978).*

(Continued)

*Primary Examiner*—Dah-Wei Yuan
(74) *Attorney, Agent, or Firm*—Wells St. John P.S.

(57) ABSTRACT

A fuel cell is described and which includes an ion exchange membrane; an electrode positioned in ion exchanging relation relative to the ion exchange membrane; a gas diffusion layer borne by the electrode and having an outwardly facing surface; a porous metal coating comprising one or more elements selected from the periodic table of elements and which has an atomic number of less than 75, and which is positioned at least in partial covering relation relative to the outwardly facing surface of the gas diffusion layer; and a current collector forcibly disposed in ohmic electrical contact with the porous metal coating.

9 Claims, 4 Drawing Sheets

U.S. PATENT DOCUMENTS

| | | |
|---|---|---|
| 6,146,780 A | 11/2000 | Cisar et al. |
| 6,153,330 A | 11/2000 | Kenyon et al. |
| 6,183,898 B1 | 2/2001 | Koschany et al. |
| 6,194,099 B1 * | 2/2001 | Gernov et al. ............... 429/213 |
| 6,200,698 B1 | 3/2001 | Carlstrom, Jr. |
| 6,207,310 B1 | 3/2001 | Wilson et al. |
| 6,218,035 B1 | 4/2001 | Fuglevand et al. |
| 6,218,039 B1 | 4/2001 | Mease et al. |
| 6,228,518 B1 | 5/2001 | Kindler |
| 6,232,008 B1 | 5/2001 | Woznickzka et al. |
| 6,255,012 B1 | 7/2001 | Wilson et al. |
| 6,268,076 B1 | 7/2001 | Diekmann et al. |
| 6,280,868 B1 | 8/2001 | Badwal et al. |
| 6,280,870 B1 | 8/2001 | Eisman et al. |
| 6,287,717 B1 | 9/2001 | Cavalca et al. |
| 6,291,094 B1 | 9/2001 | Yoshimura et al. |
| 6,468,682 B1 | 10/2002 | Fuglevand et al. |
| 6,531,238 B1 | 3/2003 | King |
| 6,566,004 B1 | 5/2003 | Fly et al. |
| 6,613,468 B1 * | 9/2003 | Simpkins et al. ............. 429/34 |
| 2002/0081475 A1 | 6/2002 | Simpkins et al. |
| 2003/0134178 A1 * | 7/2003 | Larson ...................... 429/44 |

OTHER PUBLICATIONS

Woo-kum Lee et al., "The Effects of Compression and Gas Diffusion Layers on the Performance of a PEM Fuel Cell," *Journal of Power Sources*, 1999 Elsevier Science, pp. 45-51.

Jari Ihonen et al., "A Novel Polymer Electrolyte Fuel Cell for Laboratory Investigations and In-situ contact Resistance Measurements," *Electrochimica Acta*, 2001 Elsevier Science, pp. 2899-2911.

U.S. Appl. No. 09/873,139, filed Jun. 1, 2001, Scartozzi et al.

U.S. Appl. No. 09/986,806, filed Nov. 13, 2001, Scartozzi.

B.D. Cullity, "Elements of X-Ray Diffraction," Addison-Wesley Publishing Co., Inc., © 1978.

* cited by examiner

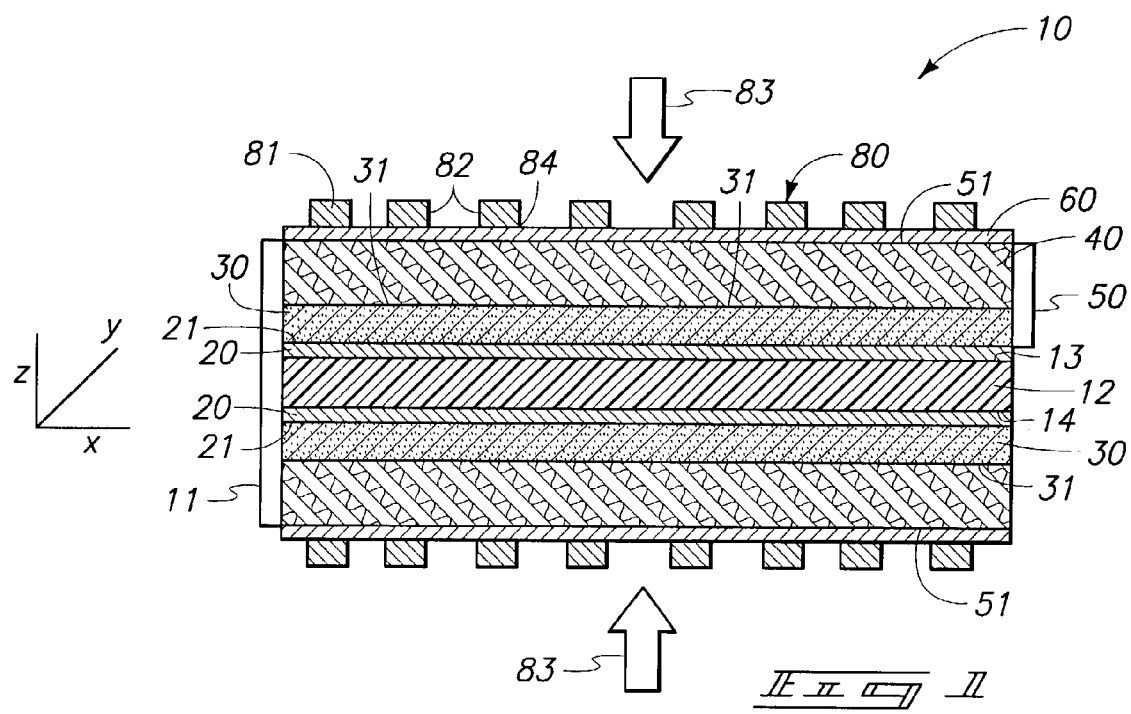
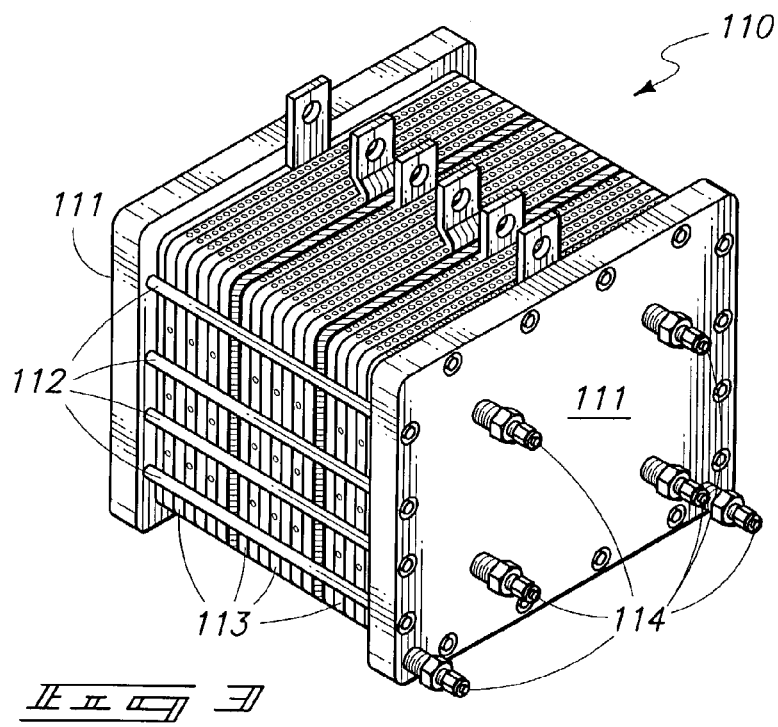

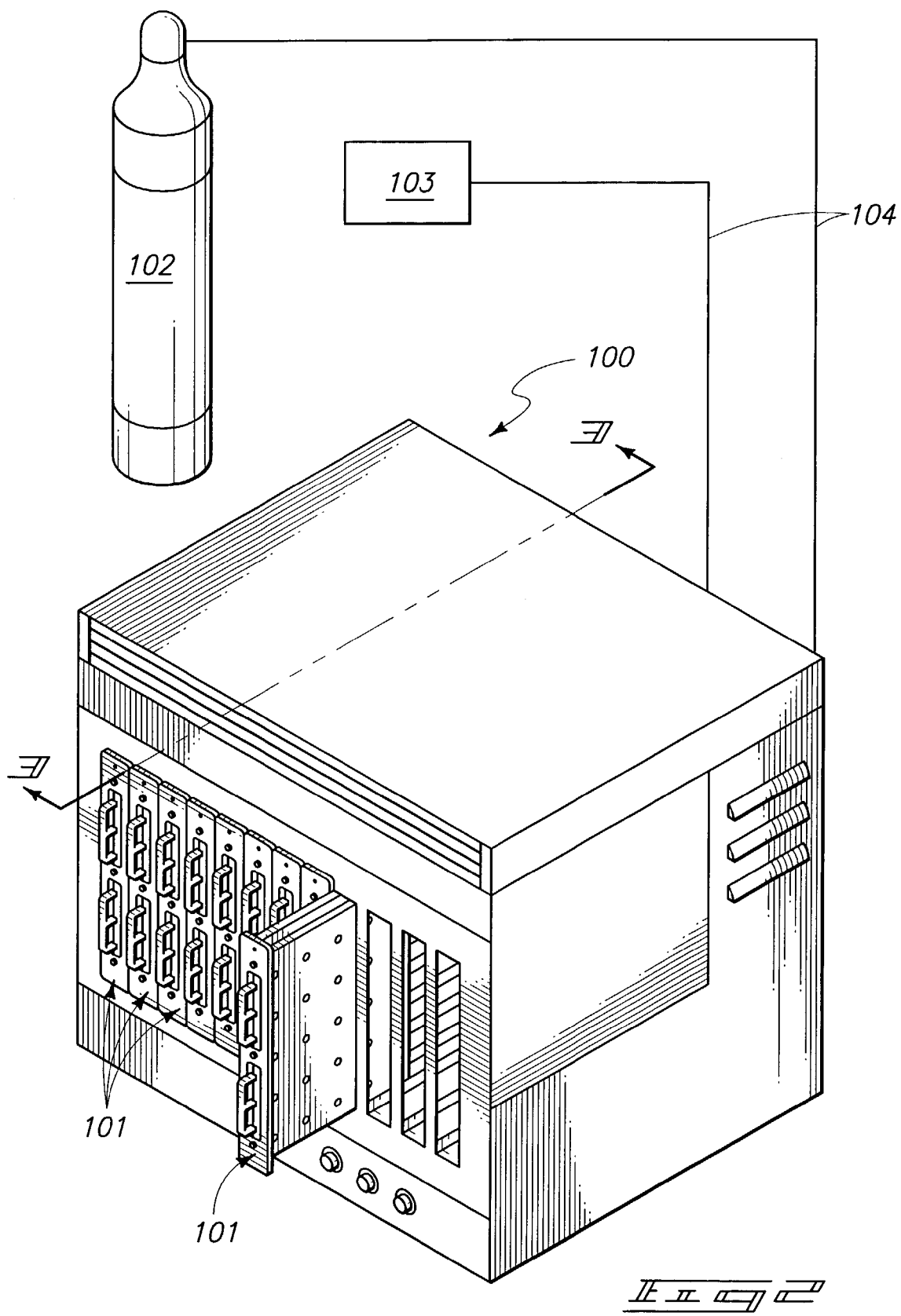

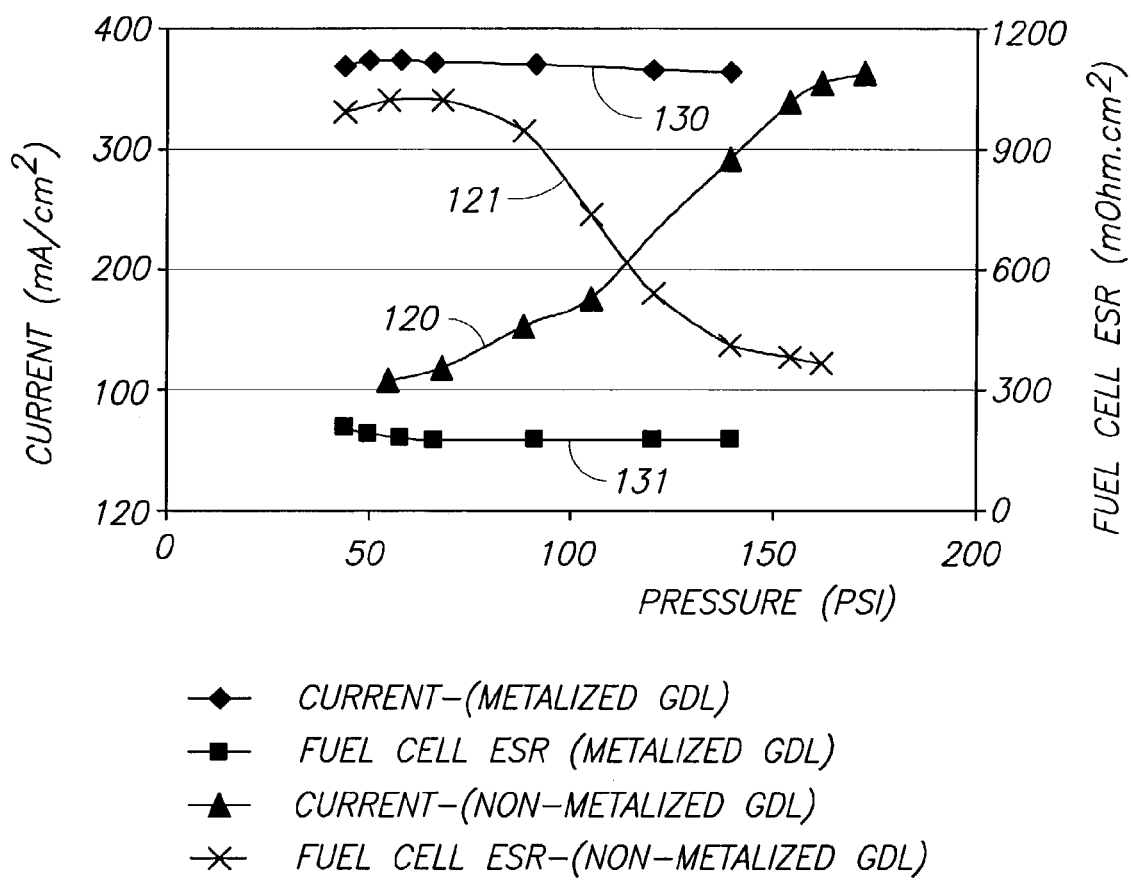

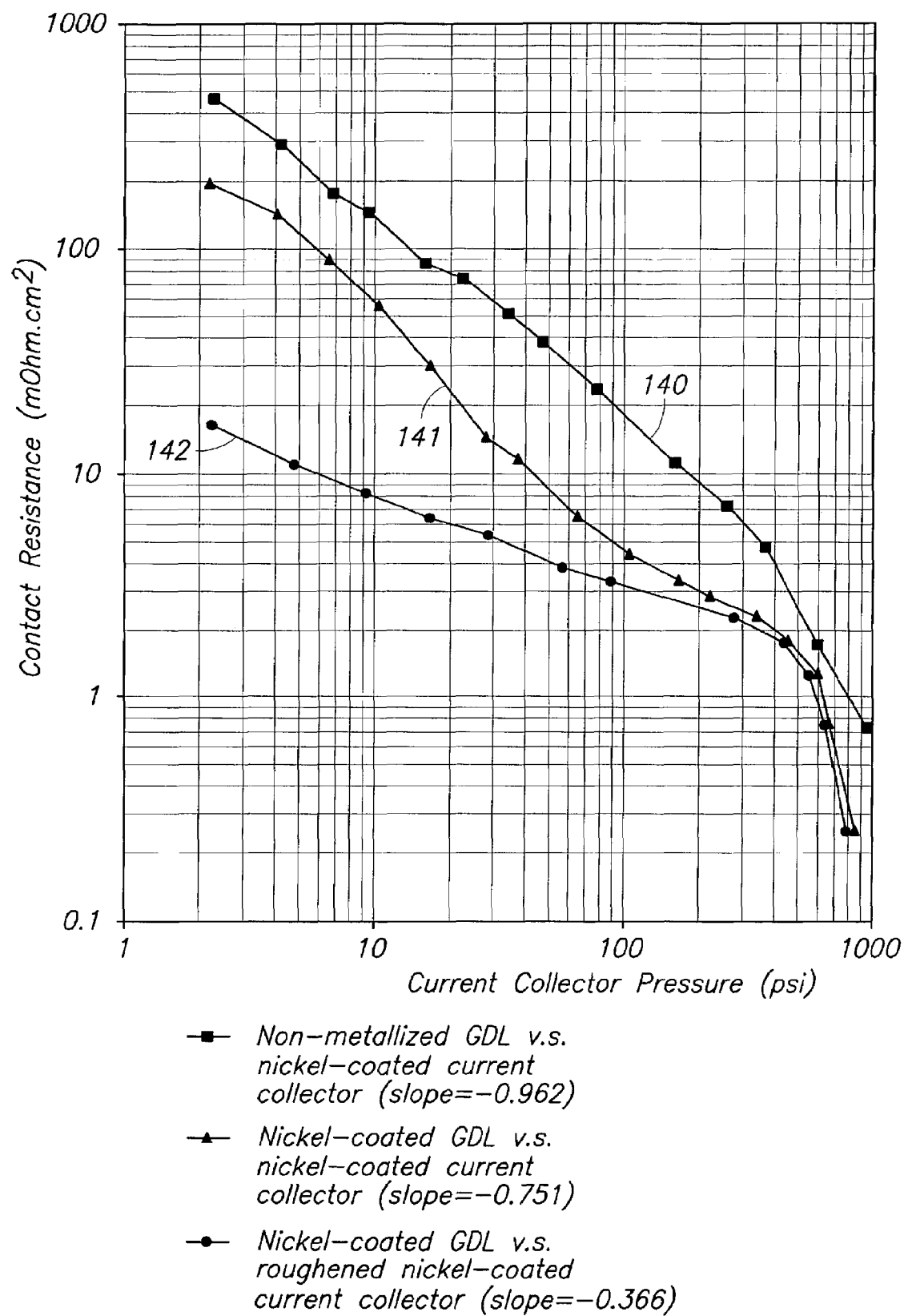

US 7,056,613 B2

FUEL CELL HAVING METALIZED GAS DIFFUSION LAYER

CROSS REFERENCE TO RELATED APPLICATION

This is a Divisional of U.S. patent application Ser. No. 10/033,599, filed Dec. 27, 2001 now U.S. Pat. No. 6,716,549, and titled "Fuel Cell Having Metalized Gas Diffusion Layer".

TECHNICAL FIELD

Field of the invention: The present invention relates to a fuel cell, and more specifically to a fuel cell incorporating a metalized gas diffusion layer which is disposed in ohmic electrical contact with an adjoining current collector, and wherein a substantially force independent contact resistance is established between the current collector and the gas diffusion layer during fuel cell operation.

BACKGROUND OF THE INVENTION

A fuel cell is a device which can readily convert chemical energy to electrical energy by the reaction of a fuel gas with a suitable oxidant supply. In a proton exchange membrane fuel cell, for example, the fuel gas is typically hydrogen, and the oxidant supply comprises oxygen (or more typically ambient air). In fuel cells of this type, a membrane electrode diffusion layer assembly is provided and which includes a solid polymer electrolyte with opposite anode and cathode sides. Appropriate electrodes are provided on the opposite anode and cathode sides. During operation, a fuel gas reacts with a catalyst present in the electrode on the anode side to produce hydrogen ions which migrate through the solid polymer electrolyte to the opposite cathode side. Meanwhile, an oxidant supply introduced to the cathode side is present to react with the hydrogen ions in the presence of catalyst which is incorporated into the electrode on that side, to produce water and a resulting electrical output.

Many fuel cell designs have been provided through the years, and much research and development activity has been conducted to develop a fuel cell which meets the perceived performance and cost per watt requirements of various users. Despite decades of research, fuel cells have not been widely embraced except for narrow commercial applications. While many designs have emerged, and which have operated with various degrees of success, shortcomings in some peculiar aspect of their individual designs have resulted in difficulties which have detracted from their widespread commercial acceptance and perceived usefulness. For example, one of the perceived challenges for fuel cell designers is the reduction of contact resistance between the current collector and an adjacent gas diffusion layer and which is borne by the membrane electrode diffusion layer assembly. This contact resistance is generally speaking inversely related to the current output of the fuel cell. Consequently, lowering the contact resistance increases the overall current output of the fuel cell.

Heretofore, the conventional prior art means of minimizing this contact resistance has been to apply relatively large amounts of direct pressure or force to the current collector which lies in immediate, ohmic electrical contact with the gas diffusion layer. The designers and manufacturers of both fuel cell stacks, and fuel cell modular power systems include in their respective fuel cell designs, various force application assemblies to transmit force directly to the current collectors to minimize contact resistance. These force application assemblies have included various mechanical schemes and other arrangements to apply force or pressure substantially evenly across the surface area of the membrane electrode diffusion layer assembly enclosed within the fuel cell. While these several schemes have operated with some degree of success, there have been inherent shortcomings which have continued to detract from their usefulness.

As a first matter, these above mentioned mechanical arrangements for applying force provide an additional level of complexity, and thus cost to the design and manufacture of such fuel cell devices. Secondly, such force application assemblies increase the perceived difficulty in repairing, maintaining and modifying such devices. For example, if an individual membrane electrode diffusion layer assembly in a fuel cell stack begins to decline in performance, or fails, the fuel cell stack must often be taken out of service, and off-line. Subsequently, the fuel cell stack must be completely disassembled in order to replace the failed component. This disassembly includes the removal of several long tie or compression bolts; disassembly of the fuel cell stack; and then the reassembly of the fuel cell stack followed by the precise application of torque to each of the same tie bolts to reestablish the appropriate amount of force applied by the stack to the plurality of membrane electrode diffusion assemblies. Further, in fuel cell stack arrangements, the pressure applied by these same tie bolts is also necessary in order to establish an appropriate amount of sealing force throughout the stack and thus prevent the escape of hydrogen; coolant; oxygen; or the by-product, water.

In a modular fuel cell power system such as what has been shown and described in U.S. Pat. No. 6,030,718, and in our pending application Ser. Nos. 09/873,139; 09/577,407 and that application filed Nov. 13, 2001, assorted fuel cell modules have been described and claimed and which utilize individual membrane electrode diffusion layer assemblies which are oriented in predetermined arrangements such that the respective modules can be readily removed from a subrack, for example, while the remaining modules continue to operate. In each of these fuel cell designs, the load which is electrically coupled to the power system continues to be substantially electrically served, and the failed fuel cell module can be readily replaced and/or serviced without the inconvenience of taking the entire fuel cell power system out of service, and off-line, as is the current prior art practice.

In addition to the shortcomings noted above, if force or pressure is not evenly applied across the face of a membrane electrode diffusion layer assembly, the fuel cell will not reach it's full potential for producing electrical power. As will be recognized, all of the foregoing have detracted from the widespread acceptance of fuel cells for use in various commercial applications.

These and other perceived shortcomings are addressed by means of the present invention.

SUMMARY OF THE INVENTION

Therefore, one aspect of the present invention is to provide a fuel cell which includes an ion exchange membrane; an electrode positioned in ion exchanging relation relative to the ion exchange membrane; a gas diffusion layer borne by the electrode and having an outwardly facing surface; a porous metal coating comprising one or more elements selected from the periodic table of elements and which has an atomic number of less than 75, and which is positioned at least in partial covering relation relative to the outwardly facing surface of the gas diffusion layer; and a current collector forcibly disposed in ohmic electrical contact with the porous metal coating.

Another aspect of the present invention is to provide a fuel cell which includes an ion exchange membrane; an electrode borne by the ion exchange membrane; a gas diffusion layer borne by the electrode and having an outwardly facing surface area; and a current collector forcibly juxtaposed relative to the gas diffusion layer, and wherein, during fuel cell operation, a contact resistance is created between the gas diffusion layer and the current collector, and which is expressed in milliohms per square centimeter of surface area, and wherein pressure applied by the current collector is expressed in pounds per square inch of surface area, and wherein the contact resistance, and the pressure applied by the current collector can be individually mathematically expressed as a logarithm, and wherein the relationship of the logarithm of the contact resistance and the logarithm of the pressure applied by the current collector is defined by a line having a slope of about 0 to about a negative 0.8.

Still another aspect of the present invention relates to a fuel cell which includes an ion exchange membrane; an electrode disposed in at least partial covering relation relative to the ion exchange membrane; a gas diffusion layer borne by the electrode, and which has an outwardly facing surface area, and which further has a porous metal coating applied thereto; and a current collector juxtaposed relative to the metal coating, and wherein a pressure of less than about 300 pounds per square inch is applied by the current collector to the juxtaposed gas diffusion layer and which creates a contact resistance, during fuel cell operation, of less than about 20 milliohms per square centimeter between the porous metal coating and the current collector, and wherein the fuel cell, during operation, generates a substantially constant electrical current when exposed to a pressure of less than about 300 pounds per square inch by the current collector at operating temperatures of less than about 300° C.

These and other aspects of the invention will be discussed in further detail hereinafter.

BRIEF DESCRIPTION OF THE DRAWINGS

Preferred embodiments of the invention are described below with reference to the following accompanying drawings.

FIG. 1 is a greatly enlarged, fragmentary, vertical sectional view of a membrane electrode diffusion layer assembly, and accompanying current collector, and which illustrates the teachings of the present invention.

FIG. 2 is a perspective view of a modular fuel cell power system which may utilize the present invention.

FIG. 3 is a perspective view of a fuel cell stack which may utilize the present invention.

FIG. 4 is a graphic depiction of the performance characteristics of the present invention as compared to several prior art examples.

FIG. 5 is a second, logarithmic, graphic depiction of the performance of the present invention as compared to the prior art.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A fuel cell having a metalized gas diffusion layer in accordance with the teachings of the present invention is generally indicated by the numeral 10 in FIG. 1. As should be understood, FIG. 1 is a greatly enlarged, fragmentary, vertical sectional view taken through a portion of a membrane electrode diffusion layer assembly which is generally indicated by the numeral 11. The membrane electrode diffusion layer assembly (MEDLA) is received within or made integral with a fuel cell device such as what is seen in FIG. 2 or 3 and which will be discussed in greater detail, hereinafter. For purposes of the present discussion, however, the membrane electrode diffusion layer assembly, as will be disclosed below, is useful in fuel cell devices which operate at temperatures of less than about 300 degrees C. Consequently, this invention is not useful in solid oxide fuel cell designs or other fuel cells which generally operate at temperatures greater than about 300 degrees C. As will be appreciated by a study of FIG. 1, aspects of the construction of the MEDLA can be expressed in terms of dimensions as measured along x, y and z axes. In this regard the x and y axis relate to length and width dimensions of an object, and the z axis relates to thickness of the same object.

As seen in FIG. 1, a fuel cell employing the present invention will typically utilize an ion exchange membrane 12, such as may be purchased under the trade name "NAFION". This ion exchange membrane is a thin, flexible and sheet-like material which is made from a fluor-polymer. This ion exchange membrane is available from the Dupont™ Company. The ion exchange membrane 12 has opposite anode and cathode sides 13 and 14 respectively.

As will be seen from a study of FIG. 1, an electrode layer 20 is disposed in ionic exchanging relation relative to the respective anode and cathode sides 13 and 14 respectively. The electrode layer 20 is of conventional design and which, during fuel cell operation, facilitates the creation and movement of ions across the ion exchange membrane 12. Each electrode layer 20 has an outwardly facing surface 21. As seen in FIG. 1, a micro-diffusion layer or first portion 30 having a given degree of porosity is juxtaposed relative to the outwardly facing surface 21 of the electrode layer 20. The micro-diffusion layer 30 comprises a carbon based slurry which may be modified, as needed, to provide different levels of porosity for the anode side 13, and the cathode side 14. Still further, the porosity of the micro-diffusion layer 30 may be manipulated in various ways to achieve various desired performance characteristics such as effective hydration of the fuel cell. Yet further, while the micro-diffusion layer 30 is shown as a single layer, the micro-diffusion layer may comprise individually discreet layers each having a different porosity. Moreover, while the porosity of the micro-diffusion layer 30 may vary across its thickness dimension (z axis), it is also possible that the micro-diffusion layer may vary in porosity in the X and Y axes, that is, across the outwardly facing surface area 31.

Continuing still with FIG. 1, it will be seen that a macro-diffusion layer or second portion is generally indicated by the numeral 40, and is immediately juxtaposed relative to the outwardly facing surface area 31 of the micro-diffusion layer 30. The macro-diffusion layer comprises, in one form, a carbon fiber based sheet having a porosity, which is, as general matter, greater than the porosity of the micro-diffusion layer 30. This macro-diffusion layer can be commercially purchased under the trade name "TORAY" or from various other commercial sources. The micro-diffusion layer 30 and the macro-diffusion layer 40 in combination define a gas diffusion layer (GDL) which is generally indicated by the numeral 50. The gas diffusion layer 50 has an outwardly facing surface area 51 which has a surface texture or topology. It should be understood that the gas diffusion layer, while described herein, as including both the macro-diffusion layer 40 and a micro-diffusion layer 30, may in some forms include only one of these two previously described diffusion layers. It being understood that FIG. 1 shows a preferred form of practicing the invention. The porosity of the macro diffusion layer 40 may be varied utilizing various prior art practices. Similarly, as discussed with respect to the micro diffusion layer the porosity of the macro diffusion layer may be varied in the x, y, and z axes.

Referring still to FIG. 1, it will be seen that a porous metal coating 60 comprising one or more elements selected from the periodic table of elements and which has an atomic number of 13 through 75 is positioned at least in partial covering relation relative to the outwardly facing surface area 51, of the gas diffusion layer 50. This metal material forms a resulting metalized gas diffusion layer 50. The porous metal coating 60 may comprise an alloy; oxide; nitride; or carbide. In the attached drawings, the gas diffusion layer 50, and the porous metal coating 60, are disposed on both the anode and cathode sides 13 and 14 of the ion exchange membrane 12. However, it will be appreciated that the gas diffusion layer 50, and the porous metal layer 60 may be disposed on only one of the anode or cathode sides 13 or 14. Yet further, it is conceivable to have a membrane electrode diffusion layer assembly 11 wherein the gas diffusion layer 50 is located on both the anode and cathode sides 12 and 13, respectively and the porous metal coating 60 is positioned on only one of the anode or cathode sides.

As discussed above, the gas diffusion layer 50 has an outwardly facing surface area 51 having a topology. Further, the porous metal coating 60 is applied in a fashion to the outwardly facing surface such that it substantially conforms to the topology., In this regard, the porous metal coating is applied in an amount of about 8 to about 150 milligrams of porous metal per square centimeter of the outwardly facing surface area 51. Moreover, the porous metal coating 60 is applied in an amount, and in a fashion which causes the resulting gas diffusion layer 50 to have an air impedance of about 23 to about 300 seconds Gurley. Gurley is defined in this application by the use of a Gurley Model 4118 (low pressure) 0.1 square inch orifice at a flow rate of about 100 cubic centimeters. As will be appreciated from studying FIG. 1, the porous metal coating 60 may be continuous as depicted in the drawing; or may be discontinuous based upon other design concerns and desired fuel cell performance parameters.

The porous metal coating 60, may include a substantially homogeneous metal or their respective alloys, oxides, nitrides, and carbides. The porous metal coating has a density of about 2.0 to about 19.0 grams per cubic centimeter. Further, the porous metal coating 60 is selected from the group of metals consisting essentially of aluminum, titanium, nickel, iron, stainless steel, manganese, zinc, chromium, copper, zirconium, silver, and tungsten, and their alloys, nitrides, oxides and carbides. For example, when the porous metal coating 60 is formed of nickel, this metal is deposited in an amount of about 28 to about 150 milligrams per square centimeter of surface area. On the other hand, when a porous metal coating of aluminum is employed, it is deposited in an amount of about 8 to about 40 milligrams per square centimeter of surface area. As a general matter, the porous metal coating 60 has an average thickness of about 25 to about 400 micrometers. The porous metal coating 60 is applied by conventional metal spraying techniques which are well known in the art and further elaboration regarding these techniques is neither warranted nor required in this application.

Referring still to FIG. 1, a fuel cell employing the present invention 10 will include a current collector which is generally designated by the numeral 80, and which is forcibly disposed into ohmic electrical contact with the porous metal coating 60. The current collector 80 is of traditional design having a main body 81 which has open areas 82 formed therein and which allows a fuel gas, such as hydrogen (on the anode side 13), and an oxidant supply, such as oxygen (on the cathode side 14) to reach the underlying porous metal coating 60 and associated gas diffusion layer 50. The current collector 80 is typically a metal, or metal alloy, or has a metal coating, cladding, or plating formed of nickel or similar metals. As noted above, the current collector transmits force or pressure 83 which is applied thereto and which maintains the current collector in an appropriate ohmic electrical contact with the underlying porous metal coating 60. During subsequent fuel cell operation, contact resistance 84 is established between the main body 81 of the current collector 80 and the porous metal coating 60.

Referring now to FIG. 2, a modular fuel cell power system 100 is shown, and which can utilize the present invention 10. As seen in FIG. 2, the modular fuel cell power system 100 includes a number of fuel cell modules 101 which may be selectively released from the modular fuel cell power system 100 while the remaining modules continue to operate and serve a load. This particular modular fuel cell power system avoids many of the shortcomings in the prior art practice by providing ease of service and repair for failed or failing fuel cell modules 101. The fuel cell power system 100 is provided with a source of fuel gas, herein shown as a bottle of hydrogen 102. Still further, a suitable source of hydrogen for use in the modular fuel cell power system may also be acquired from a chemical reformer 103. Both the reformer, and the bottled supply of hydrogen are coupled in fluid flowing relation to the modular fuel cell power system 100 by means of a suitable conduit or fuel line which is generally indicated by the numeral 104.

Referring now to FIG. 3, another fuel cell arrangement is illustrated, that being a fuel cell stack 110 which can utilize the present invention 10. The fuel cell stack 110 which is shown in FIG. 3, includes opposite end plates 111 which are operable to apply compression, by way of a plurality of tie or compression bolts 112, to a plurality of membrane electrode diffusion layer assemblies 113. Still further, fluid couplers 114 are provided, and which supply a suitable fuel gas and oxidant supply to the fuel cell for its operation.

Fuel cells, such as illustrated in FIGS. 2 and 3, are often modeled as a current source in series with a capacitance, and an accompanying electrical resistance. This electrical resistance is referred to as equivalent series resistance, or ESR. The ESR for a typical fuel cell comprises, as a general matter, the electrical resistance of the membrane electrode diffusion layer assembly 11 plus the contact resistance which is established between that membrane electrode diffusion layer assembly and the adjacent current collector 80. In the present invention, the ESR of the membrane electrode diffusion layer assembly 11 is substantially independent of the force or pressure applied; whereas on the other hand the contact resistance which exists between this assembly and the adjacent current collector, in prior art assemblies, is typically a function of pressure or force applied by the current collector.

Referring now to FIG. 4, the current produced and the fuel cell ESR is graphically shown with respect to two different fuel cells each having a 16 square centimeter active electrode surface area, and utilizing a stainless steel current collector 80. In this graphic depiction, the earlier prior art relationships are clearly seen. In this regard, the line labeled 120 shows the operational response of a prior art fuel cell which has a membrane electrode diffusion layer assembly 11, with no accompanying porous metal coating 60. As would be expected, as pressure, in terms of pounds per square inch is applied to the current collector 80, the resulting electrical current output as expressed in milliamps per square centimeter of surface area of the active electrode surface area 21 is shown to rise proportionately. Conversely, and referring to the line labeled 121, for the same prior art fuel cell which does not have a porous metal layer 60, it will be seen that the application of increasing pressure or force by way of the current collector results in a decrease in the fuel cell ESR. Since the ESR of the membrane electrode diffusion assembly is a constant and substantially independent of pressure or force, the change in fuel cell ESR is almost entirely due to a change in contact resistance. This ESR is expressed in milliohms per centimeter square of surface area. The relationship between current output, and pressure applied is quite clear relative to using a prior art, non-metalized, gas diffusion layer 50, that is, the application of increasing amounts of pressure results, on the one hand, with decreasing contact resistance, and on the other hand, a corresponding increase in the current output of the prior art fuel cell.

Referring still to FIG. 4, the performance of the present invention 10 is graphically depicted with respect to the lines labeled 130 and 131, respectively for a second fuel cell of identical structure as described above. As seen in FIG. 4, line 130 depicts the same fuel cell with a stainless steel current collector 80, and wherein the gas diffusion layer 50 of the membrane electrode diffusion layer assembly 11 has a porous metal coating 60 applied thereto. Line 130 illustrates that current output, as expressed in milliamps per square centimeter of surface area, is substantially constant when exposed to increasing amounts of pressure applied by, or to, the current collector. This is, of course, in stark contrast to line 120 which shows the relationship of pressure and current output in a fuel cell not having a metal coating 60 applied to the gas diffusion layer. Still further, line 131 shows the same fuel cell having a porous metal layer 60 applied to the gas diffusion layer 50, and wherein it will be seen that the fuel cell ESR, as expressed in milliohms per square centimeter of surface area, and thus contact resistance, remains substantially constant at pressures of less than about 300 pounds per square inch as applied by the current collector 80. Still further, line 130 and 131 demonstrate that a fuel cell incorporating the invention 10 will operate at pressures which would render a prior art fuel cell arrangement nearly inoperable or commercially unfeasible in view of the relatively low current output.

As will be recognized, the use of the present invention 10 results in substantial performance improvements and potentially significant cost savings. In this regard, significant manufacturing costs can be effectively eliminated from fuel cell fabrication inasmuch as many of the design features which are employed to exert the pressure necessary to render a prior art fuel cell operational are substantially reduced, or eliminated. Still further, less expensive materials can be used in the fabrication of a fuel cell inasmuch as relatively low pressures are needed to effectuate maximum current density and minimum contact resistance. In this regard, for example, in the assembly of suitable fuel cell modules 101, mere sealing pressure need only be applied to achieve maximum current output and minimum contact resistance within the same fuel cell module.

Referring now to FIG. 5, several logarithmic relationships are shown and which demonstrate the relationship between the amount of pressure or force applied by, or to the current collector 80, expressed in pounds per square inch, and the contact resistance, as established between the current collector and the underlying porous metal coating 60 during fuel cell operation. As seen in FIG. 5, line 140 shows a prior art fuel cell arrangement and the logarithmic relationship which is established for a current collector 80 having a nickel coating, and a gas diffusion layer 40 without a porous metal coating 60. The contact resistance established between the current collector and the adjacent gas diffusion layer 40 is expressed in milliohms per square centimeter of surface area. Line 140 which shows the relationship of the logarithm of the contact resistance and the logarithm of the pressure applied by the current collector is characterized by a slope of about negative 0.962.

Referring still to FIG. 5, line 141 shows the same logarithmic relationship noted above, except as it now relates to a porous gas diffusion layer 40, which has porous metal coating 60 of nickel applied thereto. As should be understood, the relationship of the logarithm of the contact resistance, and the logarithm of the pressure applied by the current collector, is characterized, in line 141 as having a slope of about negative 0.751.

Finally, line 142 in FIG. 5 shows the logarithmic relationship of contact resistance and pressure in a fuel cell employing a gas diffusion layer 40 having a porous metal layer 60 comprising nickel. Further, a current collector 80 having a nickel coating which has been roughened in a predetermined amount is also employed. The logarithmic relationship of the contact resistance and the pressure applied by the current collector is characterized by a line (142) having a slope of about 0.366. For the present invention 10, therefore, the relationship of the logarithm of the contact resistance and the logarithm of the pressure applied by the current collector is characterized by a line having a slope of about 0 to about negative 0.8.

OPERATION

The operation of the described embodiment of the present invention 10 is believed to be readily apparent and is briefly summarized at this point. The present invention 10 includes an ion exchange membrane 12; an electrode 20 which is borne by the ion exchange membrane; a gas diffusion layer 50 having an outwardly facing surface 51 and which is borne by the electrode; and a current collector 80 forcibly disposed in ohmic electrical contact with the gas diffusion layer, and wherein a substantially force independent contact resistance 84 is established between the current collector 80 and the gas diffusion layer 50 during fuel cell operation.

As seen in FIGS. 1, 4 and 5, the electrode 20; ion exchange membrane 12; and the gas diffusion layer 50 form a membrane electrode diffusion layer assembly 11 and which has a porous metal coating 60; and wherein the membrane electrode diffusion layer assembly, during fuel cell operation produces substantially constant electrical current when exposed to a pressure of greater than about 3 pounds per square inch and less than about 300 pounds per square inch of surface area, at fuel cell operating temperatures of less than about 300 degrees C.

As earlier disclosed, the porous metal coating 60 is applied to the outwardly facing surface area 51, and is disposed in ohmic electrical contact with the current collector 80. The current collector may have an open area 82 in an amount of about 10% to about 80%. Further, the porous metal coating 60 comprises one or more elements selected from the periodic table and which have an atomic number of 13 to 74. The gas diffusion layer 50 which is employed with the present invention and combined with the porous metal coating 60 has a combined air impedance of about 23 to 300 seconds Gurley. Yet further, and as seen in lines 141 and 142 of FIG. 5, the logarithm of the pressure applied by the current collector 80 to the gas diffusion layer 50; and the logarithm of the contact resistance as measured between the gas diffusion layer 50, and the current collector 80, is characterized by a line having a slope of about 0 to about negative 0.8.

Therefore, it will be seen that a fuel cell having a porous metal coating 60, as described above, forms a metalized gas diffusion layer which provides many advantages over the prior art devices and practices employed heretofore. The present invention 10 effectively reduces contact resistance and resulting equivalent series resistance in a fuel cell and causes a resulting substantially constant current output. The present fuel cell 10 operates at temperatures of less than 300 degrees, and provides substantially constant electrical current and constant contact resistance across a wide range of pressures including pressures which would merely be characterized as sealing pressure. In view of the many advantages provided by the invention 10, substantial cost savings can be realized in designing and manufacturing fuel cells. This will, in turn, reduces the relative cost per watt to produce electrical power, and makes fuel cells a better option for various commercial applications.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A fuel cell comprising:
    an ion exchange membrane;
    an electrode borne by the ion exchange membrane;
    a gas diffusion layer having an outwardly facing surface area and which is borne by the electrode, and wherein the gas diffusion layer is a carbon fiber based sheet which has a topology, and wherein a porous metal layer substantially conforms to the topology; and
    a current collector forcibly disposed in ohmic electrical contact with the gas diffusion layer, and wherein a substantially force independent contact resistance is established between the current collector and the gas diffusion layer during fuel cell operation.

2. A fuel cell comprising:
    an ion exchange membrane;
    an electrode borne by the ion exchange membrane;
    a gas diffusion layer having an outwardly facing surface area and which is borne by the electrode, and wherein the gas diffusion layer is a carbon fiber based sheet having a topology, and wherein a porous metal layer substantially conforms to the topology, and wherein the gas diffusion layer and the porous metal layer have a combined air impedance of about 23 to about 300 seconds Gurley; and
    a current collector forcibly disposed in ohmic electrical contact with the gas diffusion layer, and wherein a substantially force independent contact resistance is established between the current collector and the gas diffusion layer during fuel cell operation.

3. A fuel cell comprising:
    an ion exchange membrane;
    an electrode borne by the ion exchange membrane;
    a gas diffusion layer having an outwardly facing surface area and which is borne by the electrode, and wherein the gas diffusion layer is a carbon fiber based sheet, and wherein a metal layer is deposited on the outwardly facing surface in an amount of about 8 to about 150 milligrams per square centimeter of surface area, and wherein the contact resistance is expressed in milliohms per square centimeter of surface area, and the pressure is expressed in pounds per square inch of surface area, and wherein the contact resistance and the pressure applied by the current collector, can each be mathematically expressed by a logarithm, and wherein the relationship between the logarithm of the contact resistance measured between the gas diffusion layer and the current collector, and the logarithm of the pressure applied by the current collector to the gas diffusion layer is characterized by a line having a slope of 0 to about negative 0.8; and
    a current collector forcibly disposed in ohmic electrical contact with the gas diffusion layer, and wherein a substantially force independent contact resistance is established between the current collector and the gas diffusion layer during fuel cell operation.

4. A fuel cell as claimed in claim 3, and wherein the current collector applies a pressure of about 3 to about 300 pounds per square inch of surface area.

5. A fuel cell as claimed in claim 3, and wherein the metal layer is selected from the group of metals consisting essentially of aluminum, titanium, nickel, iron, stainless steel, manganese, zinc, chromium, copper, zirconium, silver, tungsten, and their respective nitrides, oxides, carbides and alloys.

6. A fuel cell as claimed in claim 3, and wherein the porous metal layer is selected from the group of metals and their respective nitrides, oxides carbides and alleys which have a density of about 2.0 to about 19.0 grams per cubic centimeter.

7. A fuel cell as claimed in claim 3, and wherein the metal layer is a nickel layer which is borne by the gas diffusion layer and which is further oriented in ohmic electrical contact with the current collector and wherein the nickel layer is deposited in an average amount equal to about 28 to about 150 milligrams per square centimeter of surface area of the gas diffusion layer.

8. A fuel cell as claimed in claim 3, and wherein the metal layer is an aluminum layer which is borne by the gas diffusion layer and which is further oriented in ohmic electrical contact with the current collector, and wherein the aluminum layer is deposited in an average amount of about 8 to about 40 milligrams per square centimeter of surface area of the gas diffusion layer.

9. A fuel cell as claimed in claim 3, and wherein the metal layer has an average thickness of about 25 to about 400 micrometers.

* * * * *

UNITED STATES PATENT AND TRADEMARK OFFICE
CERTIFICATE OF CORRECTION

| | |
|---|---|
| PATENT NO. | : 7,056,613 B2 |
| APPLICATION NO. | : 10/431870 |
| DATED | : June 6, 2006 |
| INVENTOR(S) | : Lijun Bai et al. |

It is certified that error appears in the above-identified patent and that said Letters Patent is hereby corrected as shown below:

Column 10, Claim 6, replace "carbides and alleys" with --carbides and alloys--.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,056,613 B2
APPLICATION NO. : 10/431870
DATED : June 6, 2006
INVENTOR(S) : Lijun Bai et al.

Page 1 of 1

It is certified that error appears in the above-identified patent and that said Letters Patent is hereby corrected as shown below:

Column 10, Claim 6, line 45, replace "carbides and alleys" with --carbides and alloys--.

This certificate supersedes the Certificate of Correction issued July 8, 2008.

Signed and Sealed this

Twenty-ninth Day of July, 2008

JON W. DUDAS
*Director of the United States Patent and Trademark Office*